US011091126B2

(12) United States Patent (10) Patent No.: US 11,091,126 B2
Mouleyre et al. (45) Date of Patent: Aug. 17, 2021

(54) END JOINING PIECE FOR A WINDSCREEN WIPER OF A MOTOR VEHICLE

(71) Applicant: Valeo Systèmes d'Essuyage, Le Mesnil Saint Denis (FR)

(72) Inventors: Guillaume Mouleyre, Issoire (FR); Vincent Gaucher, Issoire (FR); Stéphane Houssat, Issoire (FR); Laurent Thierry Andre Masse, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 75 days.

(21) Appl. No.: 16/428,538

(22) Filed: May 31, 2019

(65) Prior Publication Data

US 2019/0366983 A1 Dec. 5, 2019

(30) Foreign Application Priority Data

May 31, 2018 (FR) ...................................... 1854724

(51) Int. Cl.
*B60S 1/38* (2006.01)
(52) U.S. Cl.
CPC ........... *B60S 1/3889* (2013.01); *B60S 1/3887* (2013.01); *B60S 1/3891* (2013.01); *B60S 1/3875* (2013.01); *B60S 1/3894* (2013.01)
(58) Field of Classification Search
CPC ........ B60S 1/3851; B60S 1/40; B60S 1/3886; B60S 1/3887; B60S 1/3889; B60S 1/3891;
(Continued)

(56) References Cited

U.S. PATENT DOCUMENTS 6,668,419 B1 * 12/2003 Kotlarski .................. B60S 1/38
15/250.43
8,769,761 B2 * 7/2014 Bousset ................ B60S 1/3887
15/250.43
(Continued)

FOREIGN PATENT DOCUMENTS

DE 102013212507 * 12/2014
EP 2540583 A2 1/2013
(Continued)

OTHER PUBLICATIONS

Search Report Issued in Corresponding French Application No. 1854724, Dated Mar. 27, 2019 (8 Pages).

*Primary Examiner* — Gary K. Graham
(74) *Attorney, Agent, or Firm* — Osha Bergman Watanabe & Burton LLP (57) ABSTRACT

An end joining piece (4) for a windscreen wiper for a glazed surface of a motor vehicle is disclosed. The end piece has at least a receipt receptacle (410) for receiving an end part of a longitudinal vertebra (20), and at least one flexible tongue (6a, 6b) which is configured to go from a first, position of rest, to a second, retracted position, by displacement in a first direction (F2a, F2b) during the insertion of the longitudinal vertebra in the receipt receptacle (410), the flexible tongue including an engagement ramp along which the vertebra is made to thrust, to provide the tongue with its second, retracted position. The engagement ramp (620a, 620b) has an inclination which is configured to exert on the longitudinal vertebra a force which tends to displace this vertebra in a second direction (F3a, F3b), which, together with the first direction of displacement, forms a non-zero angle.

9 Claims, 6 Drawing Sheets

(58) Field of Classification Search
CPC .... B60S 1/3894; B60S 1/3874; B60S 1/3879;
B60S 1/3875
USPC ......... 15/250.451–250.454, 250.43, 250.201
See application file for complete search history.

(56) References Cited

U.S. PATENT DOCUMENTS

| | | | |
|---|---|---|---|
| 9,902,373 B2 * | 2/2018 | Bousset | ................ B60S 1/3889 |
| 2007/0061993 A1 * | 3/2007 | Lee | ....................... B60S 1/3808 |
| | | | 15/250.201 |
| 2014/0123430 A1 | 5/2014 | Bex et al. | |

FOREIGN PATENT DOCUMENTS

| | | |
|---|---|---|
| EP | 3081440 A1 | 10/2016 |
| EP | 3251903 A1 | 12/2017 |

* cited by examiner

END JOINING PIECE FOR A WINDSCREEN WIPER OF A MOTOR VEHICLE

The invention relates to the field of wiping and/or cleaning of the glazed surfaces of a motor vehicle, and it concerns more particularly a windscreen wiper for an application of this type.

Wipers for motor vehicles are designed to remove, by sweeping, the liquids and dirt which can disrupt the view which the driver has of his environment. These wipers generally comprise at least one drive arm which carries out an angular to-and-fro movement against a glazed surface to be wiped/cleaned, and at least one windscreen wiper comprising a scraper blade or wiper blade made of a resilient material. The windscreen wiper is attached to the drive arm of the wiping system by means of a connection assembly which is configured such that, driven by the movements of the wiper and the arm, the wiper blade rubs against the glazed surface to be wiped/cleaned, and sweeps away from it the water and a certain amount of dirt, in order to discharge them out of the field of vision of the driver.

Different windscreen wiper technologies are known, including a flat blade technology, wherein the windscreen wiper comprises a semi-rigid support structure which retains the wiper blade along its entire length.

The present invention concerns more particularly a flat blade, a support structure of which comprises for example at least one curved longitudinal vertebra. The curvature of this vertebra makes it possible in particular to retain the wiper blade placed against the glazed surface, even at the longitudinal ends of the windscreen wiper, i.e. at the ends of a windscreen wiper of this type in its main direction of extension. The curvature vertebra thus constitutes a means for distribution, along the length of the wiper, of the force generated by the drive arm, in order to place the wiper blade against the surface to be wiped/cleaned. The wiper blade and curvature vertebra are conventionally accommodated in a common structure or support structure of the wiper blade, and, by extension, of the windscreen wiper. In order to retain the wiper blade and support structure together, it is known to place, at one of their longitudinal ends at least, and preferably at both of them, an end joining piece which is configured to cooperate with the longitudinal ends of each of these elements. An end joining piece of this type thus has the function of joining, at one of their longitudinal ends at least, the wiper blade, the longitudinal vertebra and the support structure, and of locking them together.

The technical problem for which the present invention proposes to provide a solution is that of putting into place an end joining piece as has just been briefly described, and mechanical retention, within this end joining piece, of the elements received in it. More specifically, the end joining piece must be able to be put into place easily, for example during the total or partial replacement of a worn windscreen wiper, and, once it has been put into place, it must ensure correct retention of the windscreen wiper. It is known to ensure the retention of the windscreen wiper, i.e. both the blade and the vertebra, in the end joining piece, by means of use of one or a plurality of resilient means within this joining piece, which resilient means are in the form of flexible tongues which are displaced mainly in a direction and in a first sense of retraction under the effect of the force exerted during the insertion of the windscreen wiper in the end joining piece, and which, once this putting into place has been carried out, thanks to their return to the original position by displacement in a second, opposite direction, exert a force of retention of the windscreen wiper within the end joining piece. The compromise between a low insertion force, for ease of putting into place, and strong retention force, for good retention of the assembly in operation, is however problematic to establish. In particular, in practice, breakage of the aforementioned resilient means can take place when the end joining piece is put into place on the windscreen wiper.

In this context, the subject of the present invention is an end joining piece for a windscreen wiper for a glazed surface of a motor vehicle, the end joining piece comprising at least:
- a receipt receptacle which is designed to receive an end part of a longitudinal vertebra forming part of a support structure of the windscreen wiper;
- at least one flexible tongue which is configured to go from a first, position of rest, across the receipt receptacle, to a second, retracted position, thus permitting the passage of the longitudinal vertebra, by means of displacement in a first direction during the insertion of the end part of the longitudinal vertebra in the receipt receptacle, the said flexible tongue comprising an engagement ramp along which the vertebra is made to thrust, in order to provide the tongue with its second, retracted position. According to the invention, the engagement ramp has an inclination which is configured to exert on the longitudinal vertebra a force which tends to displace this vertebra in a second direction, which, together with the first direction of displacement, forms a non-zero angle.

Advantageously, the engagement ramp is a substantially flat surface, to within the production tolerances, forming, together with a longitudinal and vertical plane on the one hand, and with a peripheral area forming a border of the tongue towards the exterior of the receipt receptacle on the other hand, respectively a first angle and a second angle which are non-zero. Within the receipt receptacle previously defined, the engagement ramp thus forms an inclined face, which is oriented, with reference to the directions and orientations previously defined, towards the top of the end joining piece according to the invention, and towards the interior of the receipt receptacle.

It is understood that the engagement ramp extends from an articulation edge of the tongue, which forms a junction between the tongue and a structural element of the joining piece, such as to form a narrowing of the passage in the receptacle when the tongue is in the first, position of rest. As previously stated, the joining piece is in this case distinguished in that the ramp forms a face which is inclined towards the top of the end joining piece, because of this form of the ramp, which narrows the passage, but also towards the interior of the receptacle provided in the joining piece.

As a result of the foregoing arrangement, when the end joining piece according to the invention is put into place at a longitudinal end of a windscreen wiper, the engagement ramp exerts, on the end part of a support structure of this wiper, a force which tends to thrust the aforementioned end part towards the interior of the receipt receptacle previously defined.

By convention, throughout the present document, the qualifiers and terms "longitudinal", "length", apply to the main direction in which there extend the end joining piece which is the subject of the invention, as well as a windscreen wiper which an end joining piece of this type is configured to receive in a wiper for a motor vehicle. The qualifiers and terms "transverse", "width" apply to a direction substantially perpendicular to the longitudinal direction, and represent the width of the end joining piece and of the windscreen wiper. The qualifiers "vertical", "height" designate the direction which is perpendicular to both the longitudinal direction and the transverse direction. In a wiper system in which a windscreen wiper comprising an end joining piece according to the invention is in the position of work, i.e. placed against a glazed surface to be wiped/cleaned, the qualifiers "lower" or "bottom" designate more specifically the regions close to the surface to be wiped in the vertical direction, and the qualifiers "upper" or "top" designate the regions which are distant from the latter in this same vertical direction.

These directions and orientations apply equally well to an end joining piece according to the invention, and to a windscreen wiper provided with a joining piece of this type at one and/or the other of its longitudinal ends. Thus, in an end joining piece according to the invention, the qualifiers "lower" or "bottom" will designate more particularly hereinafter the regions of the joining piece which are configured to receive a scraper blade of a windscreen wiper.

With reference to these different directions and orientations, an end joining piece according to the invention is in the form of a complex part with a main direction of extension which is substantially parallel, to within the production tolerances, to the aforementioned longitudinal direction. More specifically, an end joining piece according to the invention comprises a wall with a complex form and an end wall which extends substantially along a vertical transverse plane, such that the complex wall and the end wall delimit together an inner volume of the end joining piece, with longitudinal extension, which is closed at one of its longitudinal ends by the aforementioned end wall, and open at its opposite longitudinal end. By convention, hereinafter "front" will designate the region in the aforementioned longitudinal direction of the end joining piece by means of which the aforementioned receipt receptacle is open, and "rear" will designate the opposite region of the end joining piece according to the invention in its longitudinal direction, i.e. the region of the end joining piece which is situated towards the end wall previously defined.

The end joining piece according to the invention also comprises a separation wall, substantially parallel to a transverse longitudinal plane, the presence of which delimits, within the inner volume previously defined, in the vertical direction, a receipt receptacle which is configured to receive an end part of a longitudinal vertebra of a windscreen wiper, and a groove which is configured to receive a wiper blade of a windscreen wiper of this type.

Preferably, with reference to the directions and orientations previously defined, the receipt receptacle is situated, in the vertical direction, above the groove for receipt of the wiper blade.

In a windscreen wiper equipped with an end joining piece according to the invention, the latter is put into place by simultaneous insertion, in the longitudinal direction previously defined, of an end part of the longitudinal vertebra and of the wiper blade, respectively in the aforementioned receipt receptacle and groove. More specifically, an insertion of this type is carried out in particular by relative sliding, in the longitudinal direction previously defined, supported on an upper face of the separation wall previously defined, from the front to the rear, i.e. from the entry of the receipt receptacle towards the end wall previously defined, of an end part of the longitudinal vertebra of the windscreen wiper into the aforementioned receipt receptacle.

Advantageously, the receipt receptacle comprises means for guiding and locking of the end part of the aforementioned support structure. These means for guiding and locking are for example in the form of at least one rib substantially parallel to a vertical longitudinal plane, which rib is configured to be placed supported in the vertical direction on the longitudinal vertebra, in order to limit its deflection in the said vertical direction.

The means for guiding and locking of the longitudinal vertebra within the inner volume of the end joining piece according to the invention also comprise at least one flexible tongue arranged within the receipt receptacle previously defined.

More specifically, the aforementioned flexible tongue(s) comprise(s) an area which is configured to receive in a supported manner the end part of the longitudinal vertebra of a windscreen wiper when the end joining piece according to the invention is put into place at an end of this windscreen wiper.

When the end joining piece according to the invention is put into place at a longitudinal end of a windscreen wiper, the end part of the support structure slides on the flexible tongue(s) previously defined, supported on this or these flexible tongue(s), and the latter is/are retracted, in the vertical direction, below the end part of the support structure of the windscreen wiper. This movement of the flexible tongue(s) in the first direction previously described is made possible in particular by means of the resilience of the material which constitutes the end joining piece according to the invention, and by means of the form of this or these flexible tongue(s) within the inner volume of the aforementioned end joining piece.

According to a particularly advantageous, but non-exclusive, embodiment of the invention, two flexible tongues as previously defined are arranged within the inner volume of the end joining piece according to the invention. Advantageously, these two flexible tongues are disposed symmetrically relative to a vertical longitudinal plane of symmetry of the end joining piece. Hereinafter, the invention will be described according to this particularly advantageous, but non-exclusive, configuration of an end joining piece according to the invention. The characteristics described hereinafter for a flexible tongue thus apply identically to the other flexible tongue which is arranged symmetrically relative to a vertical longitudinal plane of symmetry of the end joining piece according to the invention.

According to the invention, the engagement ramp is the first region of the flexible tongue with which the end part of the longitudinal vertebra of a windscreen wiper comes into contact when the end joining piece according to the invention is put into place on a wiper of this type. The engagement ramp advantageously forms a lateral face of the flexible tongue, and more specifically a lateral face of the flexible tongue which is oriented towards the interior of the receipt receptacle previously defined.

The end joining piece according to the invention can have one or more of the following characteristics, taken separately or in combination:

the engagement ramp has a leading edge forming a chamfer. In other words, for each flexible tongue, the engagement ramp previously defined forms a face which is inclined relative to a base surface of this flexible tongue, and the aforementioned leading edge, which constitutes the intersection between the engagement ramp and this base surface, forms a chamfer of the engagement ramp. Thus, in a windscreen wiper which is equipped with an end joining piece according to the invention, the insertion force which is exerted during the first moments of the sliding of the end part of the support structure of the windscreen wiper is equally distributed on the surface of this chamfer, consequently contributing further towards reducing the risks of breakage of the flexible tongue during this operation of putting into place;

the flexible tongue comprises a peripheral area disposed transversely on the exterior of the engagement ramp, the peripheral area comprising a lateral border and a clearance surface which extends the lateral border longitudinally opposite the articulation edge of the flexible tongue previously described, the said border and the said clearance surface forming between them a non-zero angle. In other words, the peripheral area thus comprises two distinct surfaces which are substantially flat, to within the production tolerances, forming a non-zero angle between them;

the clearance surface is configured such that, when the end joining piece according to the invention is put into place at a longitudinal end of a windscreen wiper, i.e. when the end part, previously defined, of the longitudinal vertebra of this windscreen wiper is completely engaged in the receipt receptacle previously defined, the lower face of the longitudinal vertebra is supported on a ridge delimiting this clearance surface. This therefore reduces the area of contact, and limits the insertion forces. In particular, the clearance surface can have a transverse dimension which increases progressively going away from the lateral border.

The invention also extends to a windscreen wiper comprising at least one longitudinal vertebra and a wiper blade which is configured to be applied against a glazed surface of a motor vehicle, the windscreen wiper implementing an end joining piece as has just been described. A windscreen wiper of this type can also have one or more of the following characteristics, taken separately or in combination:

an end part of the longitudinal vertebra of the windscreen wiper comprises a notch which, together with the at least one flexible tongue of the end joining piece previously described, is configured to form a means for locking the longitudinal vertebra within the receipt receptacle of the said end joining piece. More specifically, the end part of the longitudinal vertebra has, to within the production tolerances, a substantially flat form which, in the windscreen wiper according to the invention is substantially parallel to the transverse longitudinal plane of the separation wall previously defined, and the aforementioned notch is arranged, in the transverse direction previously defined, starting from one of the longitudinal edges of the aforementioned end part. According to the invention, the location of the notch in the end part of the longitudinal vertebra and the dimensions of the notch are configured such that, when the end joining piece is in place at the end of the windscreen wiper, one of the flexible tongues is located, in the vertical direction, facing the notch, in order to regain its original position of rest, and thus, by means of its resilience, to provide a locking form by snapping into the aforementioned notch. The cooperation of the notch with the flexible tongue engaged inside it thus provides retention of the longitudinal vertebra of the windscreen wiper within the end joining piece, mainly in the longitudinal direction of the windscreen wiper;

the engagement ramp has an outer surface which forms together with a plane perpendicular to the second direction an angle which is substantially equal to a bevel angle formed between a longitudinal edge and a transverse end edge of the longitudinal vertebra. More specifically, according to this characteristic of the invention, the intersection between the longitudinal edges of the end part of the longitudinal vertebra of the windscreen wiper and a transverse end edge of this longitudinal vertebra is formed by a wall which connects these two bevelled edges. In other words, the end part of the support structure of the windscreen wiper according to the invention has, at its end which is configured to be engaged in the receipt receptacle of the end joining piece, corner cuts between its longitudinal edges and its transverse end edge. The coincidence of the angle of the aforementioned bevel with the angle which the engagement ramp forms with the vertical direction previously defined permits progressive engagement and guiding of the end part of the aforementioned support structure with the flexible tongue. This results in facilitated insertion within the end joining piece, as well as in better guiding of the support structure within this joining piece.

The invention also relates to a wiper system for a motor vehicle comprising at least one windscreen wiper as has just been described.

Other characteristics, details and advantages of the invention will become more clearly apparent by means of the following description and the drawings in which:

FIG. 2*bis* is a schematic view in perspective of an end joining piece according to the invention, in which the two flexible tongues are in the retracted position, with the longitudinal vertebra forcing the tongues into this retracted position not being represented in this case;

FIG. 4*bis* is a representation of the flexible tongue in FIG. 4;

It should be noted firstly that, although the figures describe the invention in detail for its implementation, it will be appreciated that they can be used to define the invention better if applicable. It should also be noted that, throughout the figures, elements which are similar and/or fulfil the same function are indicated by the same reference.

With reference to the orientations and directions previously defined, the longitudinal direction will be represented in all the figures by the direction of an axis (Ox), the transverse direction will be represented by the direction of an axis (Oy), and the vertical direction will be represented by the direction of an axis (Oz), with the trihedron (O, x, y, z) forming a direct trihedron. Relative to this trihedron, the qualifiers "high" or "upper" will be represented by the positive direction of the axis (Oz), the qualifiers "low" or "lower" being represented by the negative direction of this same axis (Oz). It should be noted that the directions thus defined are those of an end joining piece and a windscreen wiper according to the invention, and that they are not associated with the directions and orientations of a vehicle equipped with these elements. In other words the longitudinal (Ox), transverse (Oy) and vertical (Oz) directions can have any orientations relative to the longitudinal L, transverse T and vertical V directions of a motor vehicle equipped with the invention.

Figure 1:
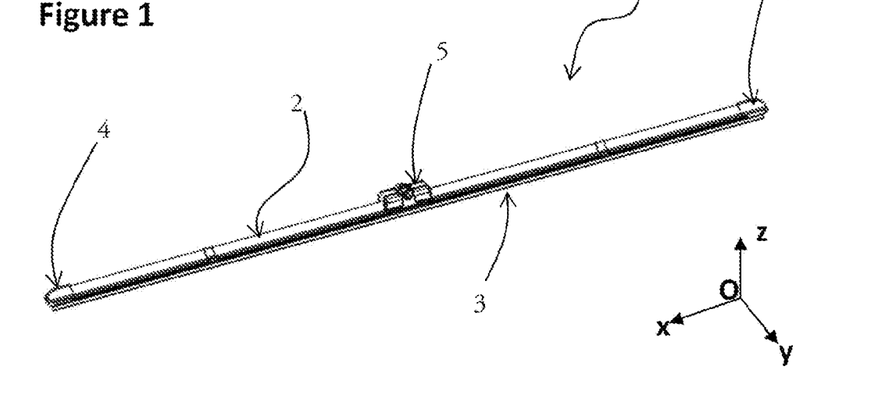
FIG. 1 is a general schematic view in perspective of a windscreen wiper designed to wipe/clean a glazed surface of a motor vehicle, the longitudinal ends of the wiper being provided respectively with an end joining piece according to the invention.

With reference to FIG. 1, a windscreen wiper 1 of a wiper assembly for a motor vehicle has a form which is elongate in the longitudinal direction of the axis (Ox) previously defined, and its width extends in the transverse direction of the axis (Oy) previously defined. In particular, it comprises a support structure 2, in which a scraper blade 3 is received, as well as a longitudinal vertebra 20 which is accommodated in the support structure and is configured to provide a good compromise between rigidity and flexibility necessary for the wiper function of the wiper, and, at each of its ends in the aforementioned longitudinal direction (Ox) it is equipped with an end joining piece 4.

The windscreen wiper 1 also comprises an assembly 5 for connection to a drive arm, not represented in FIG. 1, which carries out an angular to-and-fro movement above the glazed surface to be wiped/cleaned. In this angular to-and-fro movement of the drive arm, the windscreen wiper 1 and its scraper blade 3 are placed and driven in an angular movement against the glazed surface in order to carry out the required wiping/cleaning operation.

Each end joining piece 4 is configured to receive a longitudinal end of the support structure of the windscreen wiper, and in particular at the same time a longitudinal end of the vertebra 20 and a longitudinal end of the scraper blade 3. Each end joining piece 4 thus ensures the retention in particular of the support structure 2, of the vertebra 200 and of the wiper blade 3 of the windscreen wiper 1 at its longitudinal ends. In practice, each end joining piece 4 is put in place at a longitudinal end of the windscreen wiper 1 by insertion, in the end joining piece, of an end part of the vertebra 20 previously described, and of an end part of the scraper blade 3. More specifically, each end joining piece 4 is put into place in particular by sliding of an end part of the aforementioned vertebra 20 in the longitudinal direction (Ox) previously defined, within the end joining piece 4. The end joining piece 4 is advantageously produced by injection into a mould of plastic material selected in particular for its mechanical resilience properties.

Figure 2:
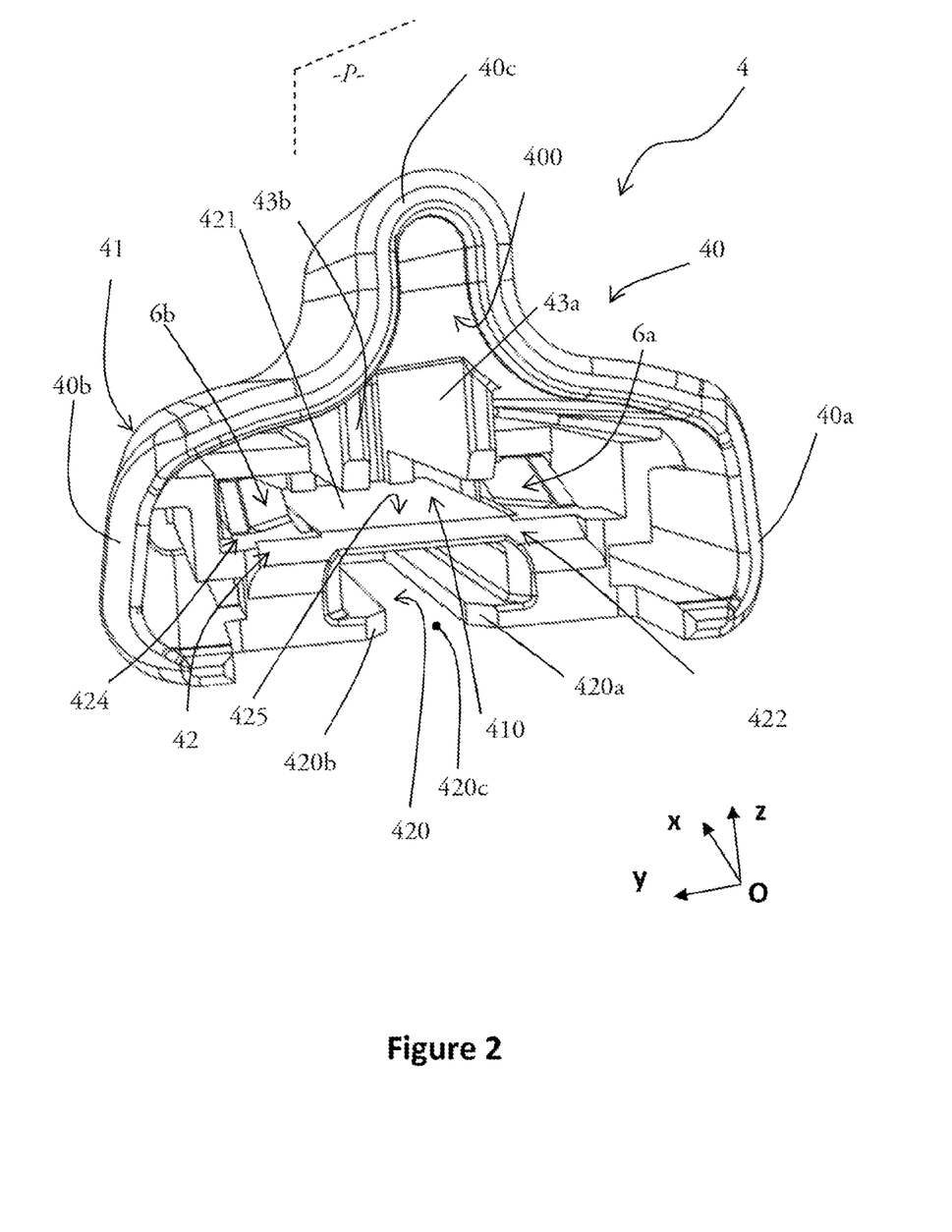
FIG. 2 is a schematic view in perspective of an end joining piece according to the invention, in which two flexible tongues are in the position of rest across a receipt receptacle.

FIG. 2 illustrates schematically an end joining piece 4 according to the invention. With reference to this figure, the end joining piece 4 has a main direction of extension which is substantially parallel to the longitudinal direction (Ox) previously defined, and it is formed by a wall 40 with a complex form, and an end wall 41 which is substantially perpendicular to the longitudinal direction (Ox), and delimits together with the complex wall 40 an inner volume 400 of the end joining piece 4. The complex wall 40 comprises a first lateral portion 40a and a second lateral portion 40b which are connected together by a top portion 40c. As a result of the foregoing, the aforementioned inner volume 400 is open at one of its longitudinal ends, designated hereinafter as the front end and/or entry of the inner volume 400, and, at its opposite longitudinal end, designated hereinafter as the rear end of the inner volume 400, it is closed by the end wall 41 previously described. It should be noted that, according to the embodiment illustrated in the figures, which is non-exclusive, the end joining piece according to the invention has a plane of symmetry P which is substantially parallel to a vertical longitudinal plane (Oxz) defined by the axes (Ox) and (Oz). The lateral portions, respectively 40a, 40b, and the top portion 40c of the complex wall 40 are thus in this case symmetrical relative to the plane of symmetry P.

Within the aforementioned inner volume 400, the end joining piece 4 comprises in particular a separation wall 42 which is substantially flat and parallel to a transverse longitudinal plane (Oxy) defined by the axes (Ox) and (Oy). Within the inner volume 400, in the vertical direction (Oz) previously defined, the separation wall 42 delimits a receipt receptacle 410 and a groove 420. Advantageously, in the windscreen wiper 1 according to the invention, the receipt receptacle 410 is configured to receive an end part of the vertebra 20, not represented in FIG. 2, and the groove 420 is configured to receive an end part of the scraper blade 3, not represented in FIG. 2. More specifically, the end joining piece 4 is put into place on a wiper blade 1 as previously described in particular by sliding, in the longitudinal direction (Ox), of a lower face of the longitudinal vertebra supported on an upper face 421 of the separation wall 42.

Advantageously, with reference to the directions and orientations previously defined, the receipt receptacle 410 is situated, in the vertical direction (Oz), above the groove 420 in the end joining piece 4. As shown in FIG. 2, the groove 420 is partially closed in its low part by two walls, respectively 420a, 420b, which are substantially flat and parallel to the separation wall 42, facing towards one another in the transverse direction (Oy) on both sides of a central transverse longitudinal space 420c, which is designed to receive a heel of the wiper blade 3 of the windscreen wiper 1.

Advantageously, as shown in FIG. 2, the separation wall 42 has an inclined front face 422. In other words, the front face 422 of the separation wall 42, which is situated with reference to the orientations previously defined on the entry side of the inner volume 400, forms, together with a vertical transverse plane (Oyz) defined by the axes (Oy) and (Oz), a non-zero angle 423, which is shown in FIG. 2. More specifically, the aforementioned angle 423 is configured such that the front face 422 of the separation wall 42 forms, for the longitudinal vertebra forming part of the support structure of a windscreen wiper 1 according to the invention, a ramp for access to the receipt receptacle 410 previously defined. This makes it possible to facilitate the putting into place of the end joining piece 4 on the windscreen wiper 1, whilst limiting the risks of scraping and coupling of the end part of the vertebra against the separation wall 42, and thus the risks of damaging the end joining piece 4.

Figure 4:
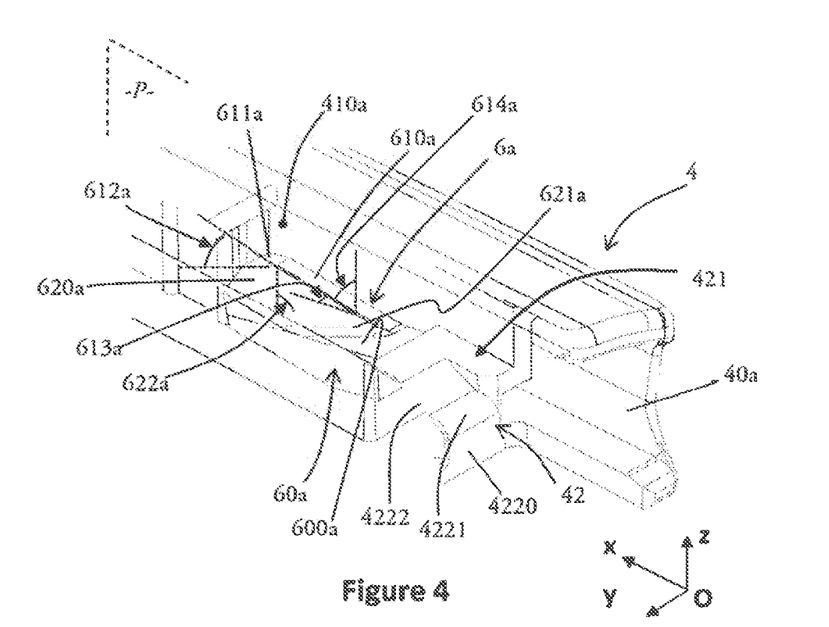
FIG. 4 is a schematic view in perspective of a detail of an end joining piece such as the one illustrated in FIGS. 2 and 3, showing more particularly a flexible tongue of the end joining piece according to the invention, in a retracted position according to that illustrated in FIG. 2*bis*.

In particular, as illustrated in FIG. 4, the access ramp formed by the front face 422 of the separation wall 42 as previously described can be formed by a first curved portion 4221 and a second portion 4222, which has a flat surface and is inclined relative to the vertical direction (Oz) and relative to the longitudinal direction (Ox).

Advantageously, the separation wall 42 comprises a first part 424 which extends mainly in the transverse direction (Oy), and a second part 425, which is substantially centred in the transverse direction (Oy), extending mainly in the longitudinal direction (Ox). The first part 424 of the separation wall 42 extends in the aforementioned transverse direction (Oy) within the receipt volume 400, between the inner surfaces of the two lateral portions 40a, 40b of the complex wall 40 previously defined. In other words, seen from above with reference to the orientations previously defined, the separation wall 42 has substantially the form of a "T", the horizontal branch of which is formed by the first part 424, and extends within the inner volume 400 of the end joining piece 4, from one to the other of the aforementioned lateral portions 40a, 40b, and the vertical branch of which is formed by the second part 425, and extends in the direction of the end wall 41, in a substantially central position in the transverse direction (Oy).

Within the receipt receptacle 410, the end joining piece 4 according to the invention advantageously comprises at least one rib, which is substantially parallel, to within the production tolerances, to a vertical longitudinal plane (Oxz) defined by the axes (Ox) and (Oz) previously described, extending downwards from an inner surface of the top portion 40c of the complex wall 40 previously defined. According to the embodiment more particularly illustrated by the figures, the end joining piece 4 comprises two ribs, respectively 43a, 43b, which are arranged symmetrically relative to the plane of symmetry P previously defined. In a windscreen wiper 1 according to the invention the aforementioned ribs 43a, 43b are configured to form a stop in the vertical direction (Oz) at the end part of the longitudinal vertebra 20, when the latter is inserted in the receipt receptacle 410.

With reference to FIGS. 2 and 2bis, the joining piece 4 according to the invention also comprises at least one flexible tongue which can adopt a position of rest (FIG. 2) in which it extends across the receipt receptacle 410, and a retracted position (FIG. 2bis) in which it permits the passage of the vertebra through this receipt receptacle.

According to the embodiment more particularly illustrated and described here, the end joining piece 4 comprises two flexible tongues, respectively 6a, 6b which are disposed symmetrically on both sides of the plane of symmetry P previously defined. In the longitudinal direction (Ox), each flexible tongue 6a, 6b advantageously extends from a rear face 426, which can be seen more particularly in FIGS. 3 and 4, of the first part 424 of the separation wall 42.

More specifically, each flexible tongue 6a, 6b is arranged within a space, respectively 410a, 410b, of the receipt receptacle 410, which is delimited in the longitudinal direction (Ox) by the first part 424, previously defined, of the separation wall 42, and by the end wall 41, and is delimited in the transverse direction (Oy) by the second part 425, previously defined, of the separation wall 42, and by one of the lateral portions 40a, 40b, previously defined, of the complex wall 40 of the end joining piece 4.

Figure 3:
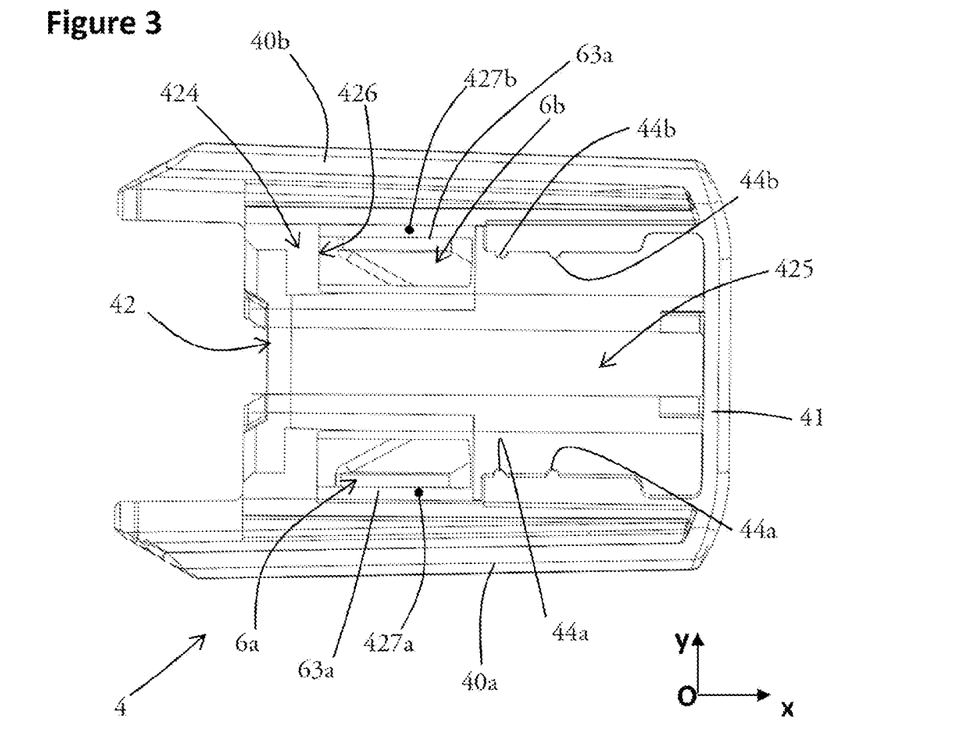
FIG. 3 is a schematic view in cross-section from above, according to a transverse longitudinal plane, of an end joining piece such as the one illustrated in FIG. 2 or in FIG. 2*bis*.

Each flexible tongue 6a, 6b is separated in the transverse direction (Oy) from the inner surface of one of the lateral portions 40a, 40b, of the end joining piece 4, by a clearance space 427a, 427b, shown in FIG. 3, i.e. in other words, there is no contact between each flexible tongue 6a, 6b and the inner surface of the corresponding lateral portion 40a, 40b.

FIG. 3 shows schematically an end joining piece 4 according to the invention seen from above, in cross-section according to a transverse longitudinal plane (Oxy) which is substantially parallel to the separation wall 42. This figure shows again the first part 424 and the second part 425 of the separation wall 42, as well as the flexible tongues, respectively 6a, 6b, and the correspondence clearance spaces respectively 427a, 427b.

FIG. 3 also shows a plurality of godroons extending in the transverse direction (Oy) from the inner surface, situated within the receipt receptacle 410, of each of the lateral portions, respectively 40a, 40b of the joining piece. According to the non-exclusive embodiment which is illustrated more particularly by FIG. 3, two godroons 44a are arranged starting from the inner surface of the first lateral portion 40a, and two godroons 44b are arranged starting from the inner surface of the second lateral portion 40b. More specifically, according to the embodiment illustrated more particularly by FIG. 3, the godroons 44a, 44b are disposed symmetrically relative to the plane of symmetry P previously defined, i.e. the godroons 44a, 44b face one another in pairs relative to the aforementioned plane of symmetry P.

According to this embodiment, each godroon 44a, 44b is in the form of a portion of a cylinder with an axis substantially parallel to the vertical direction (Oz). Advantageously, in the end joining piece 4 according to the invention, the dimensions in the transverse direction (Oy) of the godroons 44a, 44b are defined such that, when the end joining piece 4 is put into place on a windscreen wiper 1 as previously described, these godroons form locking, in the transverse direction, of the end part 20 of the longitudinal vertebra of the windscreen wiper, not represented in FIG. 3. In other words, the godroons 44a, 44b are advantageously configured to compensate for any transverse play of the strengthening vertebra within the receipt receptacle 410 of the end joining piece 4.

FIG. 4 and FIG. 4bis show in detail one of the flexible tongues, in this case the flexible tongue 6a, of the end joining piece 4 according to the invention. Arbitrarily hereinafter, the invention will be described with reference only to the flexible tongue 6a illustrated in FIG. 4, on the understanding that the configurations and characteristics described apply identically to the flexible tongue 6b, symmetrically relative to the aforementioned plane of symmetry P.

With reference to FIG. 4, the flexible tongue 6a is in the form of a polyhedron which extends, in a main direction of extension substantially parallel to the longitudinal direction (Ox), from the rear face 426 of the first part 424 of the separation wall 42 previously described.

More specifically, the flexible tongue 6a comprises a substantially parallelepiped base 60a from which there extend, next to one another in the transverse direction (Oy) and projecting upwards in the vertical direction (Oz), i.e. in the direction of the top portion 40c of the end joining piece, firstly a peripheral area 61a, and secondly an engagement area 62a. It is understood that the peripheral area 61a is disposed transversely towards the exterior of the receipt receptacle in which the flexible tongue extends. More specifically, the substantially parallelepiped base 60a comprises in particular an upper face 600a which extends in the extension of the upper face 421 of the separation wall 42, and from which the aforementioned peripheral area 61a and the engagement area 62a extend.

As previously stated, the flexible tongue is configured to tilt between a position of rest, illustrated in FIG. 2, and in which the peripheral area and the engagement area of the tongue are across the receipt receptacle, and a position of retraction, illustrated in FIG. 2bis, under the effect of insertion of the vertebra, which is not shown in this FIG. 2bis, in order then to return to the position of rest as soon as the vertebra is withdrawn, or when a notch formed in the vertebra permits this return to position of the tongue. The passage from one to the other of these positions of the tongue takes place by means of tilting around an articulation edge 601a which in this case is formed at the junction between the flexible tongue 6a and the separation wall 42. The tilting is defined as a movement in a first vertical main direction (Oz), since it takes place on a longitudinal and vertical plane, and without a transverse component.

Advantageously, the peripheral area 61a is substantially flat, and, with reference to the orientations previously defined, it is oriented towards the top of the end joining piece 4 in the vertical direction (Oz). According to the particularly advantageous, but non-exclusive, embodiment illustrated by FIG. 4, the peripheral area 61a is formed by a straight lateral border 610a and a clearance surface 611a which extends the border towards the interior of the joining piece, with the clearance surface and the lateral border being arranged on respective planes forming together a non-zero angle 612a.

In addition to this angle between the two respective planes, the border 610a and the surface 611a differ by their transverse dimension (Oy), with the transverse dimension of the border 610a being substantially constant, to within the production tolerances, along the entire length of the border 610a, the length in this case being understood as the dimension in the longitudinal direction (Ox), whereas the transverse dimension of the clearance surface 611a increases progressively going away from the border.

According to the invention, the engagement area 62a comprises an engagement ramp 620a and a leading edge 621a of the engagement ramp 620a.

The engagement ramp 620a is a substantially flat surface which forms part of an inner lateral face of the flexible tongue 6a. In other words, the engagement ramp 620a forms a part of the lateral face of the flexible tongue 6a which is oriented, within the receipt receptacle 410, towards the second part 425 of the separation wall 42, i.e. it is oriented towards the interior of the receipt receptacle 410. According to the embodiment more particularly illustrated by the figures, the engagement ramp 620a is thus oriented towards the plane of symmetry P previously defined. Consequently, in the end joining piece 4 according to the invention, the engagement ramps, respectively 620a, 620b, of the flexible tongues respectively 6a, 6b, face one another on both sides of the aforementioned plane of symmetry P (the flexible tongue 6b and the engagement ramp 620b are not represented in FIG. 4).

According to the invention, the outer surface of the engagement ramp 620a forms, together with a vertical longitudinal plane, for example the plane of symmetry P previously described, a non-zero angle 622a, i.e. the surface of the engagement ramp 620a which ensures the contact with the longitudinal vertebra during its insertion is not parallel with a plane of this type, nor does it coincide with it. In addition, as shown in FIG. 4, the plane formed by the engagement ramp 620a forms, together with a transverse longitudinal plane, for example the plane of the upper face 600a of the base 60a of the flexible tongue 6a, a non-zero angle, i.e. the engagement ramp 620a is not parallel with a plane of this type, nor does it coincide with it.

As shown by FIGS. 4 and 4bis, the foregoing arrangement results in the engagement ramp 620a being inclined at the same time relative to the lateral border 610a, relative to the clearance surface 611a, and relative to the upper face 600a of the base 60a of the flexible tongue 6a. In other words, the engagement ramp 620a forms within the receipt receptacle 410 an inclined face which is oriented towards the central part, in the transverse direction (Oy) previously defined, of the said receipt receptacle 410. In the end joining piece 4 according to the particular embodiment described and illustrated in the figures, the engagement ramps, respectively 620a, 620b, of the flexible tongues, respectively 6a, 6b, thus form two inclined faces which face one another, each oriented towards the plane of symmetry P of the end joining piece 4.

The leading edge 621a previously described is a substantially flat surface, to within the production tolerances, which constitutes the intersection between the engagement ramp 620a and the upper face 600a, previously defined, of the base 60a of the flexible tongue 6a. As shown in FIGS. 4 and 4bis, the configuration of the engagement ramp 620a relative to the upper face 600a of the base 60a of the flexible tongue 6a results in the substantially flat surface formed by the leading edge 621a being oriented, in the transverse direction (Oy), towards the interior of the receipt receptacle 410, i.e., in the embodiment more particularly illustrated by the figures, towards the plane of symmetry P of the end joining piece 4.

As shown in particular in FIG. 4bis, the junction between the peripheral area 61a and the area of engagement 62a forms a first, longitudinal ridge 8, and a second, oblique ridge 9, i.e. having an angle relative to the longitudinal direction (Ox) and relative to the transverse direction (Oy), the second ridge 9 being oblique because the transverse dimension of the clearance surface becomes progressively enlarged.

More particularly, the clearance surfaces 611a, 611b are formed respectively by a flattened part which is inclined relative to the surface forming the engagement ramps which comprises a lateral portion 6111 arranged in the longitudinal extension of the lateral border of the tongue, and an inner portion 6112 which extends this lateral portion 6111 towards the interior of the tongue, and is disposed in the longitudinal extension of the engagement ramp 620a.

Figure 5:
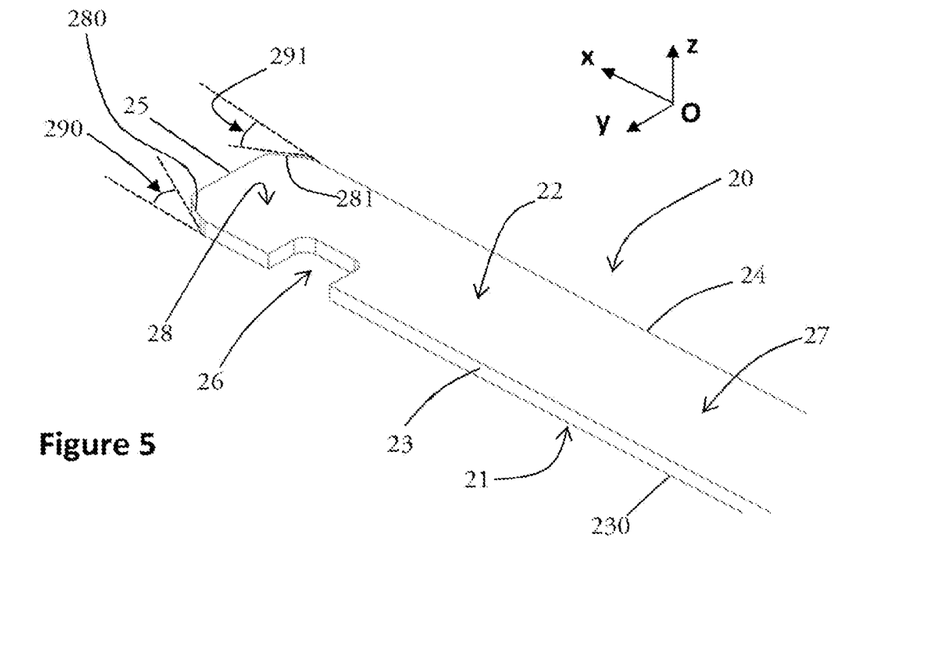
FIG. 5 is a schematic view in perspective of an end part of a longitudinal vertebra equipping the support structure of a windscreen wiper according to the invention.

FIG. 5 illustrates schematically, in perspective, an end part of a longitudinal vertebra 20 which strengthens at least partly the support structure 2 of a windscreen wiper 1 according to the invention.

With reference to this figure, the longitudinal vertebra 20 is in the general form of a plate with a narrow thickness, extending in a main direction of extension substantially parallel to the direction (Ox) previously defined. With reference to the directions and orientations previously defined, the longitudinal vertebra 20 comprises a lower face 21 and an upper face 22 which are substantially flat, to within the production tolerances, extending substantially parallel to a transverse longitudinal plane (Oxy) defined by the axes (Ox) and (Oy) previously described. The lower face 21 and the upper face 22 are joined together by two vertical longitudinal walls, respectively 23, 24, forming respectively a first longitudinal edge and a second longitudinal edge of the vertebra 20, and by a transverse wall 25 forming a longitudinal end edge of the vertebra 20.

A notch 26 is arranged in the vicinity of the end edge 25 of the longitudinal vertebra 20. More specifically, the notch 26 is arranged starting from one of the longitudinal edges 23, 24 previously defined, and it extends within the longitudinal vertebra 20 in the transverse direction (Oy). In the embodiment illustrated more particularly in FIG. 5, the notch 26 forms a substantially rectangular cut-out in the longitudinal vertebra 20, starting from the first longitudinal edge 23 of the latter. As shown in FIG. 5, the presence of the notch 26 defines in the longitudinal vertebra 20 a body 27 and an end 28 which, in the windscreen wiper 1 according to the invention, is designed to be engaged in the receipt receptacle 410 of the end joining piece 4 as previously described.

Advantageously, in a windscreen wiper 1 according to the invention, the intersection between the longitudinal edges 23, 24 and the end edge 25 of the longitudinal vertebra is not at right-angles. In other words, the corners of the longitudinal vertebra 20 are, at its end 28, machined to form respectively a first bevel 280 and a second bevel 281. In other words, the connection wall 280 between the first longitudinal edge 23 and the end edge 25 previously defined forms, together with the longitudinal direction (Ox), a first non-zero angle 290, and the connection wall 281 between the second longitudinal edge 24 and the end edge 25 forms, together with the longitudinal direction (Ox), a second non-zero angle 291. In the particularly advantageous, but non-exclusive embodiment according to the invention which is illustrated more particularly in the figures, the first angle 290 and the second angle 291 are substantially equal in terms of absolute value.

Figure 6:
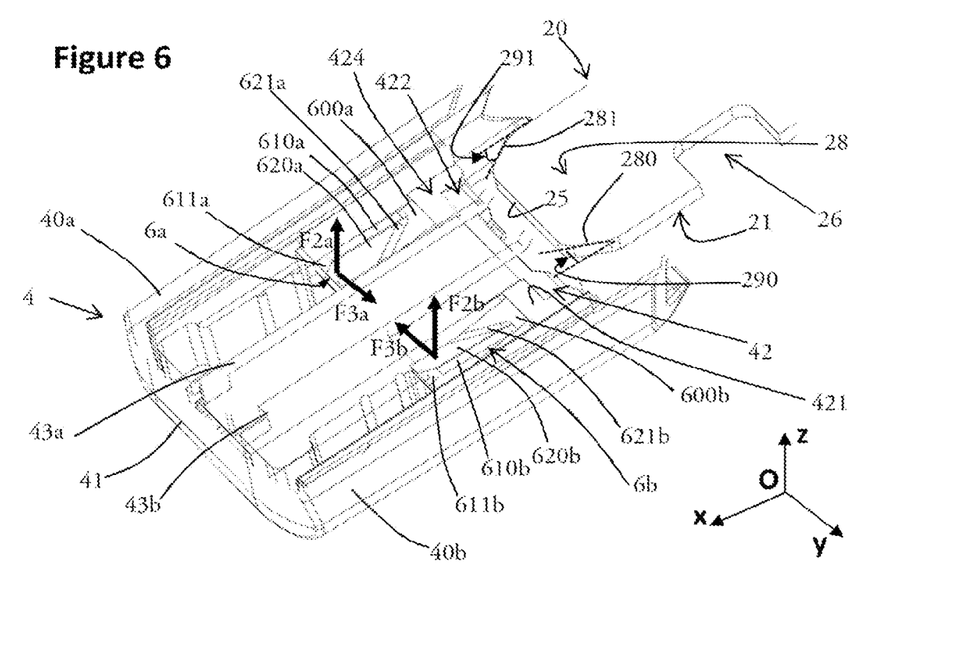
FIG. 6 is a schematic view in perspective illustrating a first step of insertion of the end part of the longitudinal vertebra in FIG. 5 in an end joining piece such as the one illustrated in particular in FIGS. 2 to 4.

FIG. 6 illustrates schematically, in perspective cut according to a transverse longitudinal plane parallel to the plane (Oxy) previously defined, the putting into place of the longitudinal vertebra 20 associated with a windscreen wiper 1 according to the invention, within an end joining piece 4 according to the invention.

As previously described, this putting into place is carried out in particular by sliding, in the longitudinal direction (Ox), of the longitudinal vertebra 20 previously described, within the receipt receptacle 410 previously defined. The direction of this relative longitudinal sliding of the aforementioned longitudinal vertebra 20 relative to the end joining piece 4 is represented by the arrow F1 in FIG. 6. Advantageously, the dimension of the end part of the longitudinal vertebra 20, i.e. the part which is designed to be inserted in the joining piece, in the transverse direction (Oy), is slightly smaller than the dimension, in this transverse direction (Oy), of the receipt receptacle 410 of the end joining piece 4, such that the relative sliding of the longitudinal vertebra 20 within the receipt receptacle 410 takes place easily and without friction against the inner surfaces of the lateral portions, respectively 40*a*, 40*b*, until the end 28 of the longitudinal vertebra 20 meets the flexible tongues 6*a*, 6*b*.

In the aforementioned relative sliding movement, after having gone beyond the front face 422 of the separation wall 42, the lower face 21 of the longitudinal vertebra 20 of the windscreen wiper 1 slides firstly against the upper face 421 of the separation wall 42, at the first part 424. The end 28 of the longitudinal vertebra 20 then approaches simultaneously the engagement ramp 620*a*, 620*b* of each of the flexible tongues 6*a*, 6*b*. More specifically, each of the bevels 280, 281, formed on both sides of the end edge 25 of the longitudinal vertebra 20, engages successively with one of the leading edges 621*a*, 621*b*, then one of the engagement ramps 620*a*, 620*b*, and finally one of the clearance surfaces 611*a*, 611*b*.

In this context, according to the invention, the angles 290, 291, previously defined and formed by the bevels arranged at the end 28 of the longitudinal vertebra 20, are respectively substantially equal to the angles 622*a*, 622*b* (shown in particular in FIG. 4) formed between the engagement ramps 620*a*, 620*b*, and a vertical longitudinal plane, such as, according to the embodiment illustrated in the figures, the plane of symmetry P of the end joining piece 4. Consequently, when the relative longitudinal sliding of the longitudinal vertebra 20 previously described is continued within the receipt receptacle 410, in the direction of the rear of the end joining piece 4, the bevels 280, 281 coincide with the engagement ramps 620*a*, 620*b* of the flexible tongues 6*a*, 6*b*, and engage against the latter.

In their original position, the flexible tongues 6*a*, 6*b* form an obstacle to the sliding of the longitudinal vertebra 20 within the receipt receptacle 410, such that the longitudinal vertebra 20 tends to be raised during the insertion, going away from the flexible tongues. The presence of the ribs 43*a*, 43*b* previously described generates a stop for the vertical displacement of the end part. The contact is thus ensured between the bevels forming the leading edge of the longitudinal vertebra 20 during its insertion, and each of the leading edges 621*b* of the flexible tongues. According to the invention, it should be noted that the complementarity of the angles between a leading edge and a bevel generates a linear contact, at the start of the displacement of the flexible tongue from its original position towards a retracted position, thus permitting passage of the end part of the longitudinal vertebra. The complementarity of forms makes it possible to increase the contact surface between the vertebra and the flexible tongues at the start of the deformation of the tongues, thus making it possible to ensure that each tongue is retracted correctly in the first direction required, i.e. perpendicular to the direction of insertion of the vertebra in the joining piece, in this case the vertical direction (Oz), without the tongue twisting under the impact of the vertebra.

Since the longitudinal vertebra 20 is blocked vertically by the ribs 43*a*, 43*b*, the progressive insertion of this end part in the joining piece 4 tends to displace the end of the longitudinal vertebra 20 along the engagement ramps and, because of the resilience of the material constituting the flexible tongues 6*a*, 6*b*, and the first inclination of the engagement ramps in the direction of the top portion 40*c* of the joining piece, the flexible tongues 6*a*, 6*b* are then displaced in the first aforementioned direction, in order to be retracted below the lower face 21 of the longitudinal vertebra 20.

The linear contact which is generated between the lower ridge of the bevels 280, 281 and the leading edges 621*b* of the flexible tongues is then continued with linear contact between this ridge of the bevels and the engagement ramps of these tongues in the continuity of the linear displacement of the vertebra in the interior of the receptacle. This linear contact continues until the flexible tongues reach their retracted position, and passes below the vertebra. The first phase of insertion of the vertebra in the interior of the receptacle is then ended, and it should be noted that, during this first phase, according to the invention, the particular inclined form of the engagement ramps has a double advantage.

Firstly, the fact that the engagement ramps are inclined towards the interior of the receipt receptacle of the vertebra, as it has been defined previously, makes it possible to centre the vertebra in the interior of the joining piece, and thus to ensure at the end of insertion that at least one flexible tongue can regain its original position by locking into the corresponding notch 26 in the vertebra. In fact, each of these engagement ramps 620*a*, 620*b* exerts on the end 28 of the longitudinal vertebra a force which is directed substantially perpendicularly to the surface of the engagement ramps 620*a*, 620*b* concerned, in a second direction illustrated by the arrows, respectively F3*a*, F3*b* in FIG. 6, thus tending to centre the vertebra towards the interior of the receipt receptacle 410. Therefore, according to the invention, at least one engagement ramp 620*a*, 620*b* is configured to exert on the longitudinal vertebra 20 inserted in the joining piece 4 a force which tends to displace this vertebra in a direction different from the direction of retraction of the flexible tongue 6a, 6b.

In addition, the fact that the inclination of the engagement ramps generates angular complementarity with the bevels provided at the end of the vertebra ensures tilting of the tongues from the position of rest to the retracted position, with linear contact between the end of the vertebra and each of the tongues, thus making the pivoting movement of the tongues reliable.

In a second phase of the insertion of the vertebra, the vertebra slides as far as the end of the receptacle, whilst being clamped between the ribs 43a, 43b and the retracted flexible tongues. Under the effect of the resilience of the material which constitutes them, the flexible tongues 6a, 6b then exert on the lower face 21 of the longitudinal vertebra a force in the first aforementioned direction, i.e. which is substantially vertical and faces towards the top portion 40c of the end joining piece 4. Together with the vertical force substantially directed vertically downwards exerted by the ribs 43a, 43b on the upper face 22 of the longitudinal vertebra 20, this force contributes towards locking the vertebra in both senses of the vertical direction within the receipt receptacle 410. According to a characteristic of the invention, the contact surface between the retracted flexible tongues and the lower face 21 of the longitudinal vertebra 20 is reduced during this second insertion phase, in order to limit the friction forces whilst the vertebra is retained between the ribs and the flexible tongues. It is understood that, when the flexible tongue is passed below the vertebra, only the joining ridge, i.e. the second ridge 9, between the engagement ramp and the inner portion of the clearance surface as has been previously described, is in contact with the lower face 21 of the longitudinal vertebra 20. Since, as shown in FIGS. 4 and 4bis for example, this ridge is oriented with inclination relative to the transverse direction (Oy), the contact between the tongue and the vertebra is intermittent when the tongues slide below the vertebra, thus decreasing the sliding forces.

The relative sliding of the longitudinal vertebra 20 within the receipt receptacle continues until the notch 26, arranged in the aforementioned longitudinal vertebra 20, is located, in the vertical direction (Oz), facing one of the flexible tongues 6a, 6b. According to the embodiment more particularly illustrated by FIG. 6, the notch 26 previously defined is located, in the transverse direction (Oy), on the same side of the plane of symmetry P as the second flexible tongue 6b.

Under the effect of the resilience of the material which constitutes it, the flexible tongue 6b, which is freed from the vertical support constraint exerted by the lower face 21 of the longitudinal vertebra 20, then returns to its initial position, providing a form of locking by snapping of the longitudinal vertebra 20 together with the end joining piece 4. This is more particularly illustrated in FIG. 7, which shows the end joining piece 4 assembled with the longitudinal vertebra 20 of a windscreen wiper 1 according to the invention.

Figure 7:
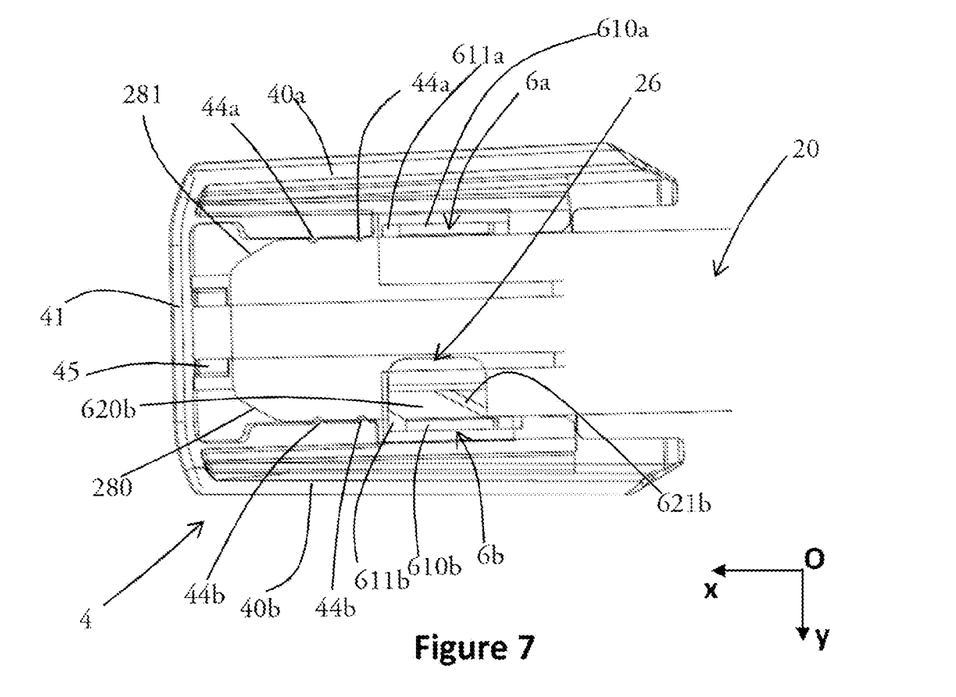
FIG. 7 is a schematic view in cross-section from above, according to a transverse longitudinal plane, of a windscreen wiper according to the invention, illustrating the cooperation of the flexible tongues and the longitudinal vertebra, once the end joining piece of this windscreen wiper is put into place on the end part of the windscreen wiper.

This FIG. 7 shows the longitudinal vertebra 20 and its notch 26 previously defined, as well as the first flexible tongue 6a, shown partially, since it is retracted below the that longitudinal vertebra 20 and the second flexible tongue 6b, which is locked by being snapped into the aforementioned notch 26. In this position, as shown in FIG. 7, the flexible tongue 6b provides longitudinal retention of the longitudinal vertebra 20 within the receipt receptacle 410, because of the straight edge formed at the end of the tongue opposite its leading edge 621. The retention of the longitudinal vertebra 20 in the joining piece in the longitudinal direction (Ox) is completed by the abutment of the vertebra against a portion 45 of the end wall 41 of the end joining piece 4.

The retention in the transverse direction (Oy) of the longitudinal vertebra within the receipt receptacle 410 is for its part ensured by the godroons 44a, 44b previously defined. It should be noted that the godroons 44a, 44b previously defined make it possible to compensate for any transverse play which exists between the end part 20 and the inner surfaces of the lateral portions 40a, 40b of the wall 40 of the end joining piece 4. They therefore make it possible to compensate for any dimensional dispersions associated with the production method of the support structure 2 of the windscreen wiper 1. More generally, the godroons 44a, 44b also make it possible for example to use the end joining piece 4 according to the invention with windscreen wiper 1 longitudinal vertebrae 20 which in particular have different transverse dimensions, thus permitting the use of an end joining piece of this type with a wide variety of windscreen wipers.

The invention as it has just been described thus makes it possible, by simple means, to provide an end joining piece 4, the putting into place of which on a longitudinal end of a windscreen wiper 1 is facilitated, with a reduced risk of breakage of the flexible guide and locking elements 6a, 6b which this end joining piece comprises, and which exerts on the windscreen wiper 1 efficient retention in the different directions of space. In other words, the invention makes it possible to provide a wiper end joining piece which makes it possible to ensure, once the joining piece has been assembled, a retention function which is just as efficient as the joining pieces previously produced, whilst making it possible to decrease greatly the force of insertion of the end of the wiper in the joining piece during the assembly.

However, the invention is not limited to the means and configurations described and illustrated, and also applies to any equivalent means or configurations and to any combination of such means. In particular, forms of the end joining piece other than those described here can be implemented, provided that the functional elements of the flexible tongues and of the end part of the windscreen wiper are present, and ensure the same functions as those described in the present document.

The invention claimed is:

1. An end joining piece for a windscreen wiper for a glazed surface of a motor vehicle, the end joining piece comprising:
    a receipt receptacle configured to receive an end part of a longitudinal vertebra forming part of a support structure of the windscreen wiper; and
    at least one flexible tongue configured to go from a first position of rest, across the receipt receptacle, to a second retracted position, thus permitting a passage of the longitudinal vertebra, by displacement in a first direction during an insertion of the longitudinal vertebra in the receipt receptacle, the at least one flexible tongue comprising an engagement ramp along which the vertebra is made to thrust, in order to provide the tongue with the second retracted position,
    wherein the engagement ramp has an inclination configured to exert on the longitudinal vertebra a force which tends to displace this vertebra in a second direction, which, together with the first direction of displacement forms a non-zero angle,
    wherein the at least one flexible tongue comprises a peripheral area disposed transversely on an exterior of the engagement ramp, the said peripheral area comprising a lateral border and a clearance surface which extends the lateral border longitudinally opposite an articulation edge of the at least one flexible tongue, the said border and the said clearance surface forming between them a non-zero angle.

2. The end joining piece according to claim 1, wherein the engagement ramp is configured to be oriented towards an interior of the receipt receptacle.

3. The end joining piece according to claim 1, wherein an inclination of the engagement ramp has a leading edge forming a chamfer of the engagement ramp.

4. The end joining piece according to claim 1, wherein the clearance surface has a transverse dimension which increases going away from the lateral border.

5. The end joining piece according to claim 1, where said at least one flexible tongue further comprising two flexible tongues disposed symmetrically relative to a plane of symmetry of the end joining piece.

6. A windscreen wiper comprising:
at least one longitudinal vertebra; and
a wiper blade configured to be applied against a glazed surface of a motor vehicle, the wiper blade comprising an end joining piece according to claim 1.

7. The windscreen wiper according to claim 6, wherein an end part of the at least one longitudinal vertebra comprises a notch which, together with the at least one flexible tongue, is configured to form a means for locking the at least one longitudinal vertebra within the receipt receptacle.

8. The windscreen wiper according to claim 6, wherein the engagement ramp has an outer surface which forms together with a plane perpendicular to the second direction an angle which is substantially equal to a bevel angle formed between a longitudinal edge and a transverse end edge of the at least one longitudinal vertebra.

9. A wiper system for a motor vehicle, comprising at least one windscreen wiper that comprises:
at least one longitudinal vertebra; and
a wiper blade configured to be applied against a glazed surface of a motor vehicle the wiper blade comprising an end joining piece, the end joining piece comprising:
a receipt receptacle configured to receive an end part of the at least one longitudinal vertebra forming part of a support structure of the windscreen wiper; and
at least one flexible tongue configured to go from a first position of rest, across the receipt receptacle, to a second retracted position, thus permitting a passage of the at least one longitudinal vertebra, by displacement in a first direction during an insertion of the at least one longitudinal vertebra in the receipt receptacle, the at least one flexible tongue comprising an engagement ramp along which the at least one vertebra is made to thrust, in order to provide the at least one tongue with the second retracted position,
wherein the engagement ramp has an inclination configured to exert on the at least one longitudinal vertebra a force which tends to displace the at least one vertebra in a second direction, which, together with the first direction of displacement forms a non-zero angle,
wherein the at least one flexible tongue comprises a peripheral area disposed transversely on an exterior of the engagement ramp, the said peripheral area comprising a lateral border and a clearance surface which extends the lateral border longitudinally opposite an articulation edge of the at least one flexible tongue, the said border and the said clearance surface forming between them a non-zero angle.

* * * * *